(No Model.) 2 Sheets—Sheet 1.

W. F. CAMERON.
Plow.

No. 237,812. Patented Feb. 15, 1881.

WITNESSES:
Chas. H. Kimball.
Wm. F. Goodwin

INVENTOR:
Wilmot F. Cameron
by his Atty.
H. M. Sylvester (No Model.) 2 Sheets—Sheet 2.

W. F. CAMERON.
Plow.

No. 237,812. Patented Feb. 15, 1881.

WITNESSES:
Chas. H. Kimball.
Wm. T. Goodwin

INVENTOR:
Wilmot F. Cameron
by his atty,
H. M. Sylvester

UNITED STATES PATENT OFFICE.

WILMOT F. CAMERON, OF DEERING, ASSIGNOR TO HERBERT M. SYLVESTER, OF PORTLAND, MAINE.

PLOW.

SPECIFICATION forming part of Letters Patent No. 237,812, dated February 15, 1881.

Application filed December 13, 1880. (No model.)

*To all whom it may concern:*

Be it known that I, WILMOT F. CAMERON, of Deering, in the county of Cumberland and State of Maine, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in plows, in which hollow cylinders of iron filled with wood or other light and durable substance are so placed in the landside and mold-board of the plow that in the passage of the plow through the ground the rollers revolve readily, and to certain improvements in the adjustable trucks at the rear end of the plow, which follow in the furrow; and the objects of my improvements are, first, to reduce the friction by the use of the rollers, which are made light and durable, and having journals or bearings that are protected against clogging with earth, &c., thereby lessening the draft of the plow in operation; second, by the use of the trucks at the rear and forward ends of the plow to afford steady action, and, by the plow being carried constantly on the forward and rear trucks when in operation, the friction is materially reduced at the bottom of the plow, the trucks being adjustable, thus overcoming certain irregularities in the surface of the ground or furrow.

Figure 1:
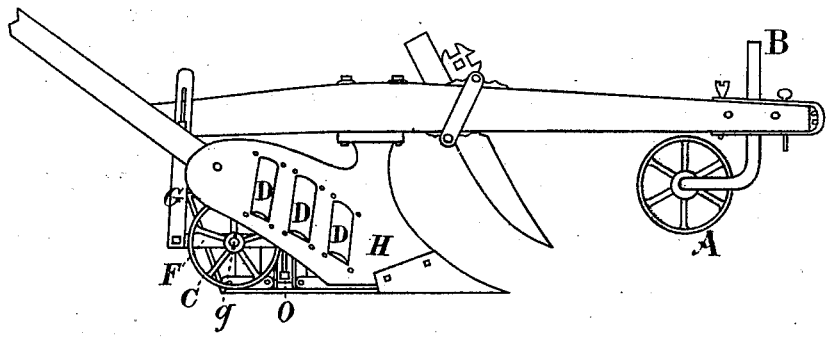
Figure 2:
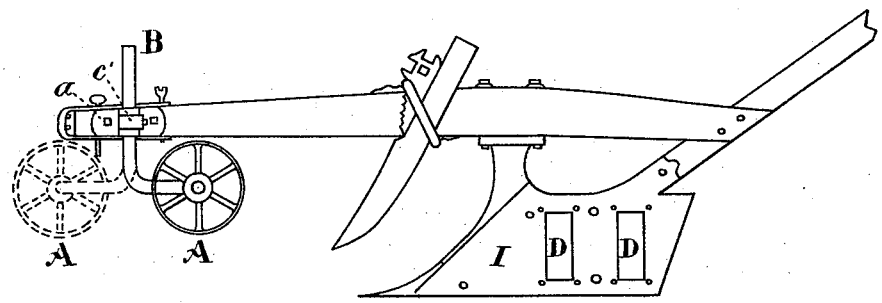
Figure 3:
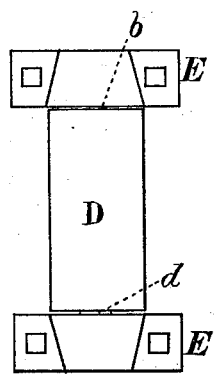
Figure 4:
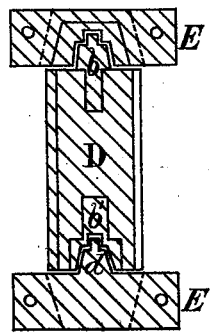
Figure 5:
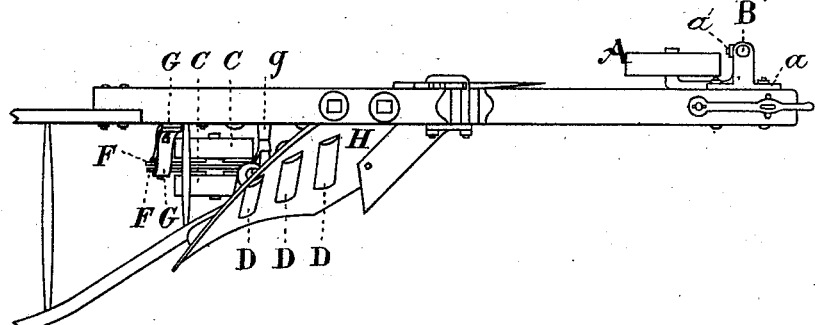
Figure 6:
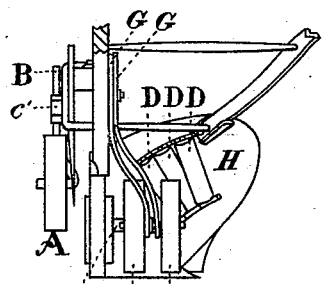
Figures 7, 8, 9:
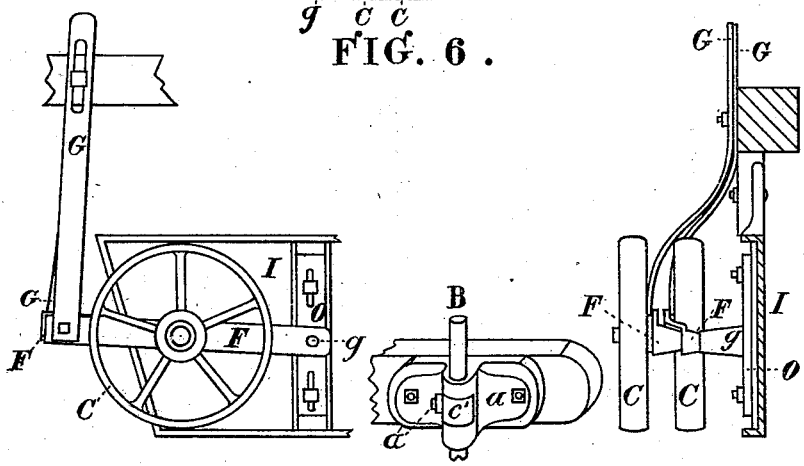

In the accompanying drawings, Figure 1 is a side view of the plow, showing the mold-board and the rollers in the same, and the trucks at the front and rear. Fig. 2 is a side view of the plow, showing the landside with the front truck. Fig. 3 is a view in elevation of the roller and method of attachment of the same to the plow. Fig. 4 is a sectional view of the roller, showing the construction of the socket in the top thereof and of a knob beneath the bottom of the roller, forming a part of a plate by which the lower end of the roller is held in position. Fig. 5 is a top view of the plow. Fig. 6 is a rear view of the plow, showing the trucks at the rear. Fig. 7 is a view in detail of the trucks at the rear on the inside. Fig. 8 is a view in detail of the rear trucks from the front. Fig. 9 is a view of the plate through which the spindle holding the forward truck passes vertically with the collar and set-screw by which the spindle is held in place.

Similar letters refer to similar parts throughout the same views.

A in Figs. 1, 2, 5, and 6 is the truck at the forward end of the plow, which is attached to the upright spindle B, the lower part of which is bent at right angles, so that the periphery of the truck lies a little outside of or beyond the vertical part of the spindle B.

$a$ represents the plate attached to the forward end of the plow-beam, through prominent ears at the upper and lower margins of which the spindle B passes, and in which it revolves freely, the spindle being held in place by the collar $c'$, which is secured to the spindle by a set-screw, $a'$. This mode of attaching the spindle B and truck A is such as to allow of the complete rotation of the spindle, so that the truck may swing around laterally and stand either in front or in the rear of the spindle, or at any angle with the plow-beam, the plate being recessed, so as to allow of the rotary passage of the set-screw $a'$.

D in Figs. 1, 2, 3, 4, 5, and 6 represents the roller in the mold-board and landside, there being three in the former and two in the latter, or more or less, as desired. The rollers are made of a casing or outer cylinder of iron or steel, (common iron pipe or tubing answering the purpose,) having the interior filled with hard wood or other light and durable material firmly driven into or made secure within the aforesaid metallic casing. The usual dimensions of the roller are about three inches in diameter and from five to six inches in length. The upper ends of the rollers, as shown in Fig. 4, are provided with a central hole in the line of the axis for the reception of a stud, $b$, as hereinafter described. The lower portions of the rollers are also provided with a similar hole, the latter being somewhat larger than the former, and having a counterbore at the lower end, so that the entire aperture may afford a suitable opening for the insertion of an iron socket, $b'$, as hereinafter described.

The stud $b$ is made of iron, with a cylindrical head slightly tapering upward, and terminating in a shoulder and smaller projecting end of uniform diameter, flat at the top. This stud is to be driven into or otherwise firmly secured within the hole above mentioned in the upper end of the roller. The socket $b'$ is also made of iron, the circumference of the socket being tightly fitted to the aperture above described in the lower end of the roller. The lower part of the socket forms a hollow cylinder slightly tapering toward the top, the interior nearly corresponding in shape with the head of the stud in the upper end of the roller. This socket is also firmly driven into or otherwise secured within the lower end of the roller. These rollers are secured in their respective positions within the mold-board and landside of the plow, so as to project outwardly through vertical slots or openings in the same, by means of the plates E E in Figs. 3 and 4. These plates are fastened on the inner sides of the above-named parts of the plow by bolts, the heads of which rest in countersunk holes in such manner as to present an even surface with the exterior of said parts, the opposite ends of the bolts being provided with nuts and screws. The lower plates rest on flanges along the lower inner margins of the landside and mold-board. These flanges not only afford support to the plates, but also give strength to such parts of the plow. The upper plates are likewise set in contact with flanges along the upper inner margins of the mold-board and landside. The lower plates are each provided with a boss, $d$, the lower or tapering part of which fits loosely into the conical opening in the socket at the bottom of the roller, while the upper or straight part sits snugly in the opening above, the boss, as a whole, being so constructed that the weight of the roller rests simply on its top, or upon the end of the journal which forms the upper extremity of the boss $d$, and upon the shoulder at the foot of said journal.

The especial advantage of this construction is, that the earth which comes in contact with the roller is effectually prevented from working into that part thereof upon which the roller itself rests or has an immediate bearing and upon which it revolves, thus not only avoiding the rapid wearing away of such part, but also averting the danger of occasional clogging or sticking, so as to arrest the turning of the roller.

Efforts have been previously made in this direction, and among others a plow has been constructed in which the lower ends of the rollers were each provided with a journal fitting into a hollow in the upper end of a convex boss entering the lower part of the roller, the convexity being such as allowed the earth to work up over the boss and down into the hollow or socket, from which there was no way of escape.

The upper plates, E, are each provided with a recess on the lower side, into which the head of the stub $b$ in the upper end of the roller that it is designed to hold in place fits loosely, except at the upper extremity, which forms a closely-fitting journal.

The rear trucks, C C, are, as seen in Figs. 6, 7, and 8, attached to two short horizontal bars of iron, near the center of the same, said bars being parallel to each other, and upon the outer sides of which are studs or axles, on which the trucks revolve. The forward ends of these horizontal bars are supported by an arm or stud passing through holes in said bars. This arm or stud extends horizontally from a vertical plate, O, as seen in Fig. 7, attached to the inner surface of the landside of the plow, the mode of attachment being by slots near the upper and lower ends of the plate, with bolts passing through them, the heads of said bolts sitting in countersunk holes upon the outer surface of the landside, while the opposite ends of the bolts are secured by nuts and screw. The forward extremity of the horizontal bar F, which supports the truck next the landside, is bent somewhat toward the latter, and is made much thicker laterally and toward the landside at and around the part through which the hole opens to afford passage for the supporting-arm. In like manner the forward end of the horizontal bar which supports the truck on the side toward the mold-board is thickened laterally toward the adjacent bar, so as to give the requisite strength to the part through which the stud-hole opens, and also to separate or set it off from the neighboring end of the contiguous bar by such a distance as will allow of the two bars moving up and down freely, side by side, and wholly independent of each other. The forward ends of these bars are maintained at the requisite distance from the landside by a shoulder on the supporting-stud $g$, and are kept in place upon said stud by means of a removable pin passing through a small hole in the end of the stud farthest from the landside. The rear ends of the horizontal bars F F are supported by vertical arms of iron, G G, to which they are attached by means of bolts passing through said bars and the respective arms with which each is connected, these bolts being loosely fastened, so as to allow of a slight pivotal movement of the arms G G thereon. The vertical arms G G are bent laterally toward the wooden arm or handle of the plow next the landside, each presenting double curves, so that the upper halves of these arms are perpendicular and the inward sides of said halves in contact with each other. Through each of these halves, where they lie in contact, as aforesaid, there is a longitudinal slot about three inches in length, through which passes a bolt, extending also through the neighboring part of the plow-beam, said bolt being secured by a nut and screwed at the inner end thereof adjacent to the slotted arms G G, and allowing the arms G G, when said nut is loosened, to play up and down, each independent of the other, in the line of their respective slots. It is evident that by means of this arrangement for supporting the rear trucks by the vertical arms G G, attached to the rear ends of the horizontal bars F F, a vibratory movement of said horizontal bars up and down at the rear ends thereof is permitted, and an adjustment may be made that will raise or lower the rear trucks and sustain the plow in such a manner as will give it a proper vertical support when plowing on a side hill, or as will tip it either to right or left.

I am aware that the adjustment of supporting-trucks at unequal heights for the purpose just mentioned is not new, broadly; but I regard the construction of the above-described parts in their relation to each other for the purpose of said adjustment as novel, and as constituting a useful improvement.

No claim is made in this application for the combination of the front and rear adjustable trucks, as these elements will form the subject-matter of another application.

What I claim, therefore, in the above-described mechanism as of my invention, and desire to secure by Letters Patent, is—

1. A roller, D, for a plow, consisting of an outer metallic casing and a filling of wood or other similar material, and provided with a stud-bearing, b, at the upper end, and a socket-bearing, b', set in the lower end, substantially as described.

2. In a plow, the roller D, consisting of an outer metallic casing filled with wood or other similar material, and having a stud, b, set in the upper end, and a socket, b', in the lower end thereof, in combination with the upper and lower plates, E E, said studs and sockets being adapted to support and hold in place the said roller, while effectually preventing the working in of earth around the wearing parts, substantially as described.

3. The rear trucks, C C, in combination with the horizontal bars F F, the supporting-stud g on the vertical slotted plate O, and the curved upright slotted arms G G, pivoted at the lower ends, and secured above at one side by means of an adjustable fastening, substantially as and for the purpose hereinbefore described.

In testimony that I claim the foregoing as my own I affix my signature in presence of two witnesses.

WILMOT F. CAMERON.

Witnesses:
 IRA S. LOCKE,
 JAMES H. WHITNEY.